United States Patent Office 3,028,594
Patented Apr. 3, 1962

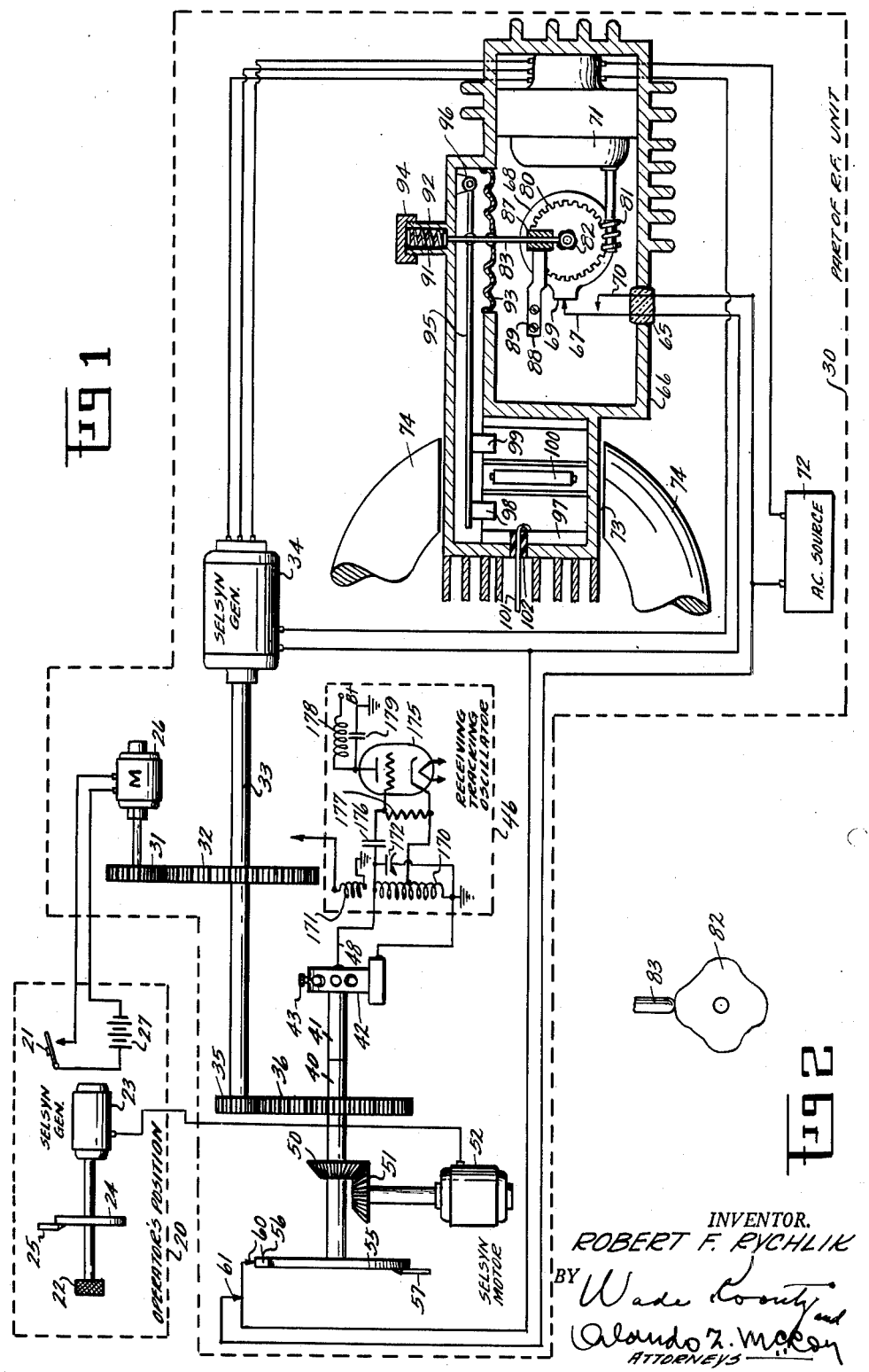

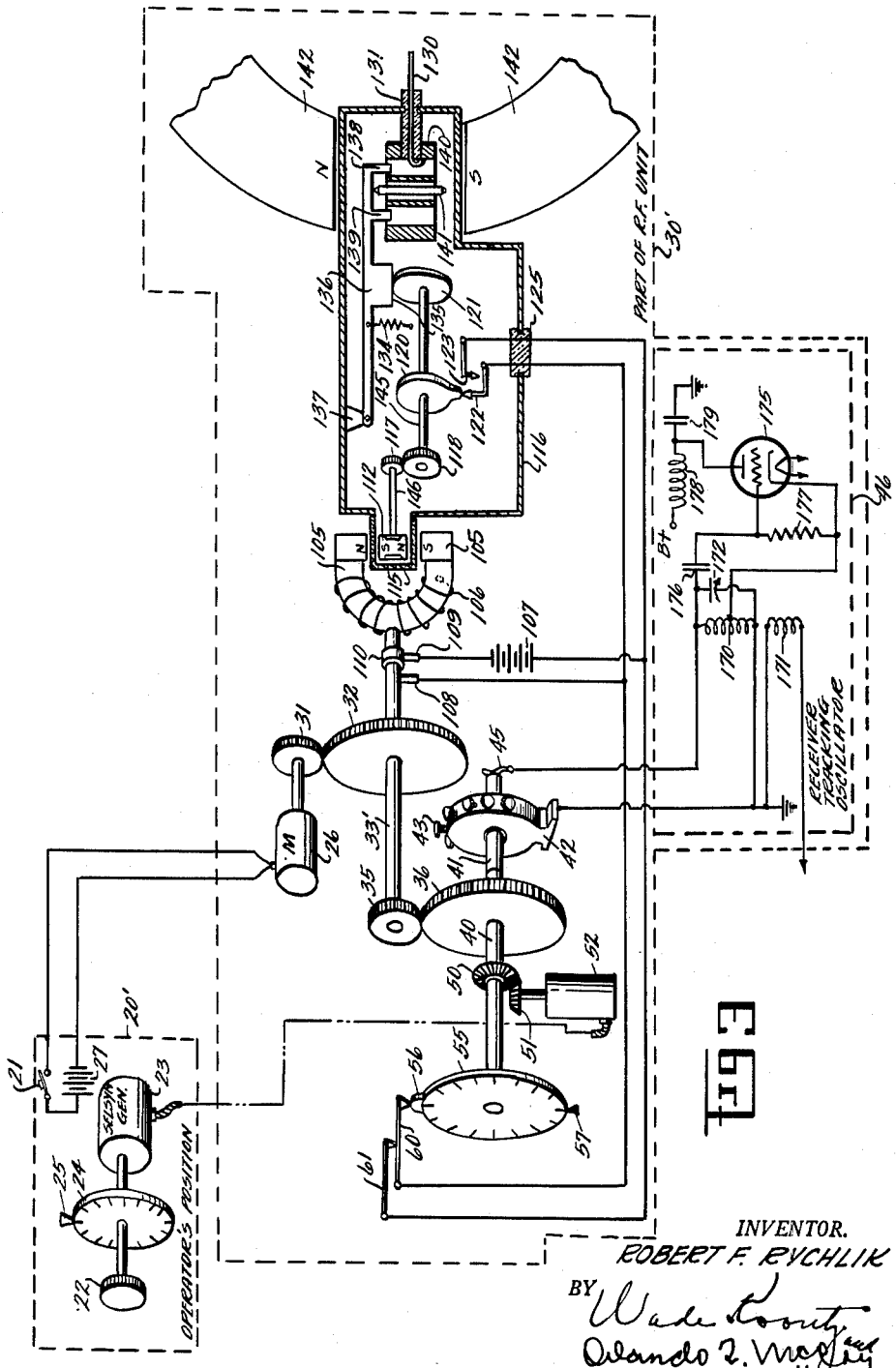

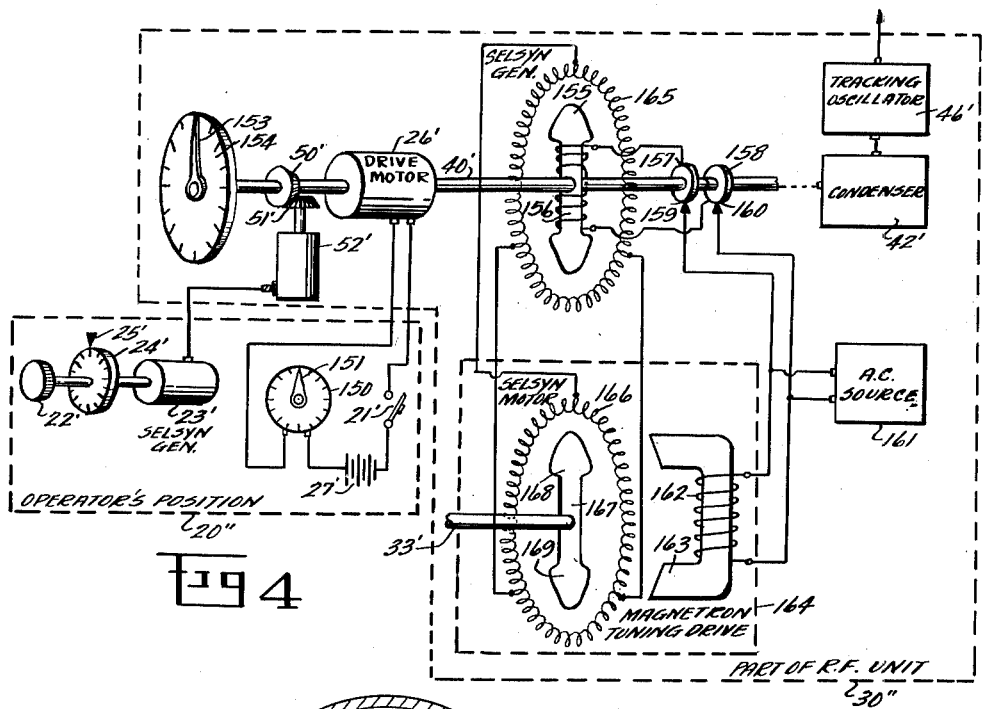
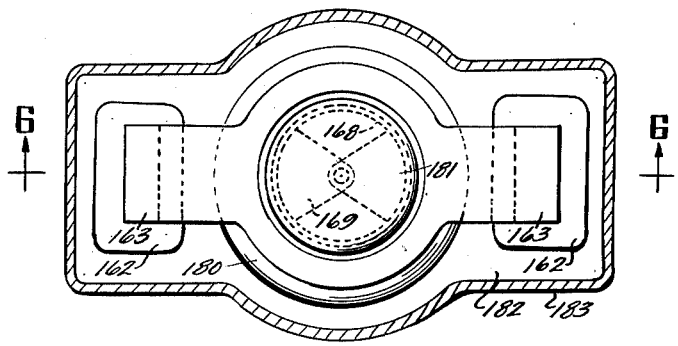
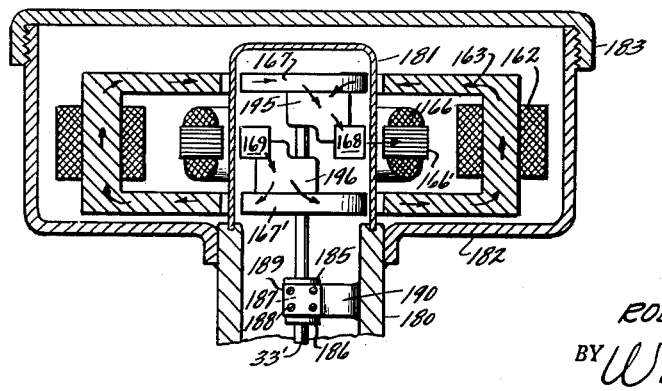

3,028,594
SELF-SYNCHRONOUS TUNING SYSTEM FOR
VARIABLE FREQUENCY RADAR SYSTEM
Robert F. Rychlik, 220 Marathon Ave., Dayton 5, Ohio
Original application Jan. 5, 1948, Ser. No. 478. Divided and this application Aug. 18, 1950, Ser. No. 180,292
2 Claims. (Cl. 343—17.2)
(Granted under Title 35, U.S. Code (1952), sec. 266)

The invention described herein may be manufactured and used by or for the Government for governmental purposes without payment to me of any royalty thereon.

This invention is a division of my copending application Serial No. 478, filed January 5, 1948, which relates to radar signal originating equipment and more particularly to a magnetron tuning drive for generating and indicating radar signal pulses of a predetermined constant frequency, together with means for changing the constant frequency to a continuously variable frequency, and inclusive of means for synchronizing received echo pulses with the generated pulses for use in radar transmitter-receiver equipment. The application Serial No. 478 issued on July 11, 1961 as the Patent No. 2,992,361 for Rapidly Tunable Magnetron.

Magnetrons for initiating radar pulses comprise a cavity containing an anode and a cathode disposed within a magnetic field. Previously devised tunable magnetrons have been characterized by fixed frequencies or variable frequencies that might possibly be tracked but with objectionable difficulty. In previously tuned magnetrons the tuning has commonly been accomplished by the use of a screw driver or the like, for altering the setting of a tuning element within the magnetron to a predetermined frequency at which the magnetron operated constantly until a new setting of the tuning means to another fixed frequency was made.

There has been no known continuously and rapidly automatically tuned magnetron available heretofore that has been adapted for operating independently without attention. Signals from all types of magnetrons tuned to a fixed frequency are readily interfered with by a jamming signal covering a frequency band within which the magnetron frequency occurs.

The present invention is directed toward the object of providing a mechanically strong, continuously controlled means for variably tuning radar signal sources such as magnetrons over a predetermined band of frequencies together with and synchronized with a receiver containing a beat oscillator that is maintained in a constant frequency relation with a signal source together with frequency indicating means.

A further object is to provide a new and improved means for controlling the tuning of radar signals at their source.

Another object is to provide improved radio devices capable of generating and synchronizing radio signals of continuously and erratically varying frequencies over a substantially broad band of frequencies and, more particularly, signals of the pulsed type such as those used in radar and the like.

A further object is to provide new and improved magnetrons that are simply, effectively and continuously variably tuned, together with indicating means from which the signal frequency may be read directly at the instrument.

With the above and other objects in view that are set forth hereinafter, illustrative embodiments of the present invention are shown in the accompanying drawings; wherein FIG. 1 is an elevational, partly diagrammatic and partly schematic drawing with parts broken away and in section, showing an embodiment of the present invention in a portion of a radar transmitter-receiver set for generating a transmissible signal of controlled frequencies and with echo signals accurately tracking any frequency variations of the transmitted signal;

FIG. 2 is an enlarged elevational fragmentary view of a magnetron tuning cam and cam rider part of the magnetron shown in FIG. 1;

FIG. 3 is a perspective, partly diagrammatic and partly schematic drawing with some parts fragmentarily broken away or in section, of the frequency determining and registering means and magnetron phasing means shown in FIG. 1, applied to another type of tunable magnetron;

FIG. 4 is a fragmentarily perspective diagram and partly broken away circuit diagram of a modified magnetron tuning means embodying a selsyn system;

FIG. 5 is a plan view from above partly in section, of the selsyn part of the magnetron tuning device indicated diagrammatically in FIG. 4; and FIG. 6 is a section taken along substantially the line 6—6 of FIG. 5.

In the embodiment of the invention shown in FIG. 1 of the accompanying drawings a radar operator at position 20 exercises control, by means of a manually operated continuous sweep switch 21 and frequency setting knob 22, over components within a frequency unit 30 that is a part of a radar transmitter-receiver set. The operation of the frequency setting knob 22 alters the frequency of radio signal pulses applied to a wave guide, not shown, as a part of a magnetron within the frequency unit 30. In the practice of the present invention, an emitted signal is at a constant frequency when the switch 21 is open and may be, if desired, of a continuously and erratically variable frequency when the switch 21 is closed. The component associations shown in FIG. 1 are believed to be in sufficient detail for imparting a clear understanding of the present invention in the absence of the remainder of an illustrative transmitter-receiver radar set apparatus and circuit.

An operator at the operator's station or position 20, by use of the frequency setting knob 22 with the continuous sweep switch 21 open, may operate the radar set, of which the disclosed components are parts, at a predetermined fixed frequency in usual manner. The frequency of operation is indicated by an immovably mounted pointer 25 upon a signal frequency calibrated scale extending along the edge of a rotatable frequency indicating disc 24. The disc 24 is mounted upon and turns with the shaft of a selsyn generator 23 and hence can be rotated by either the knob 22 or by the armature of the generator 23. With the continuous sweep switch 21 open, signal originating in the magnetron disclosed herein is of the frequency indicated by the index or pointer 25 upon the frequency indicating disc 24.

The selsyn generator 23 and the continuous sweep switch 21, at the operator's position 20, are connected electrically with a radio frequency unit 30 that is analogous in function with the correspondingly named unit in my copending application referred to above.

The operator may operate the radar set at continuously and variably changing frequencies by closing the continuous sweep switch 21. The closing of the continuous sweep switch 21 applies a direct current potential, as from a battery 27 or the like, across the field winding of a motor 26, part of the radio frequency unit 30. The closing of the switch 21 may, if desired, cause the radar set controlled from the operator's position 20 both to radiate pulsed radar signals at continuously erratically changing frequencies and also to receive back echo signals or pulses that conform by a constant frequency difference with those of the radiated pulsed signals. The continuous sweep switch 21 at the operator's position 20 is provided where desired, for initiating and for interrupting the sending of radar signals of erratically variable frequencies from the radar set of which the radio frequency unit 30 is a part.

As operative parts of the radio frequency unit 30 here disclosed, motors 26 and 52 operate tuning components that provide continuously changing capacitance to a tracking oscillator 46 and that provide variable frequency to a magnetron that produces pulsed radar energy for application to a wave guide, not shown, of the radar set. The continuously changing capacitance and the variable frequency so provided supplies a continuously and erratically modified pulsed radar signal for radiation from the radar set, of which the disclosed components are parts.

The closing of the continuous sweep switch 21 and the resultant energization of the motor 26 turns, through the pair of engaged gears 31 and 32, the shaft 33 and rotor of a selsyn generator 34. The turning of the selsyn generator shaft 33 turns, through the engaged gears 35 and 36, a shaft 40 that continues at one end in an insulation shaft portion 41 and that carries at its opposite end a frequency indicating cam disc 55.

A desired type of tracking condenser 42 that is adjustable and variably tunable by means of a plurality of screws 43 has its ungrounded inner plate, not shown, mounted upon the insulation shaft portion 41 so that it turns with the turning of the shaft 40. The capacitor 42 has its fixed outer plate grounded, as indicated. The tracking condenser 42, by means of an electrically conducting brush 45 contacting its ungrounded, inner plate, applies its output, as a capacitance of continuously variable magnitude, to receiver tracking vernier oscillator 46 as a part of the radar set that is contemplated hereby and as disclosed in my copending application referred to above. The designation of components in the oscillator 46 in this disclosure conforms with that in my copending application.

In conformity herewith the output from the variable capacitor 42 by the brush 45 is passed to the grid of tube 175 through the capacitor 176. The brush 45 is connected to a transformer primary winding 170 in parallel with a variable capacitor 172. Plate voltage is applied through a choke coil 178 to the plate of the tube 175, that is grounded to RF through capacitor 179. The grid of the tube 175 is connected through a resistor 177 with the tube cathode. The cathode of the tube 175 is grounded through a part of the transformer primary winding 170. The transformer step-down secondary winding 171 provides the output from the receiver tracking oscillator 46 that is to be applied to a beat oscillator, not shown, part of the radar set contemplated hereby.

The frequency indicating cam disc 55 on the shaft 40 is turned thereby upon the energization of the motor 26 or through the pair of beveled gears 50 and 51 upon the operation of the selsyn motor 52. The selsyn motor 52 is in electrical connection with and is maintained in step along with the selsyn generator 23 at the operator's position 20 and is in mechanical connection with the selsyn generator 34 part of the radio frequency unit 30. The frequency indicating cam disc 55 is calibrated in frequency along its edge as indicated by a fixed pointer 57. With the selsyn motor 52 in step with the selsyn generator 23, the reading indicated by the fixed pointer 25 on the disc 24 at the operator's position 20 is accomplished by the manual operation of the frequency controlling knob 22 and will cause a like frequency reading to be registered by the fixed pointer 57 upon the frequency scale on the cam disc 55 within the radio frequency unit 30.

The cam disc 55 has a cam riser 56 on its peripheral edge. The cam disc 55 is yieldingly engaged along its peripheral edge by a phasing cam rider contact 60 that is spring pressed toward the disc 55 away from a fixed phasing contact 61. The contact 61 is fixed in position so that the cam rider contact 60 makes electrical connection with the fixed contact 61 only when the cam rider contact 60 is positioned upon the cam riser 56 and so that when not so positioned, electrical connection between the cam rider contact 60 and the fixed contact 61 is broken.

The cam rider contact 60 and the fixed contact 61 are connected directly with a pair of phasing terminals comprising a cam riding contact 67 and a fixed contact 70 mounted in a glass bead 65 in an aperture in a magnetron housing 66. The cam riding contact 67 engages the edge of a cam 68 bearing a riser 69 so that connection between the cam riding contact 67 and the fixed contact 70 is interrupted once with each revolution of the cam 68. The cam riding contacts 60 and 67 are connected with the selsyn generator 34. The selsyn generator 34 is connected with a selsyn motor 71 within the magnetron housing 66. The selsyn motor 71 is maintained in step with the selsyn generator 34 as long as they are supplied with electrical power from an alternating current source 72.

The magnetron is part of the radio frequency unit 30. Radar signal pulses originate within a resonant cavity in an anode housing 73 part of the magnetron. The magnetron anode housing 73 is positioned within a magnetic field maintained between the poles of a permanent magnet 74.

The cam 68 is rotated by the selsyn motor 71 positioned within the magnetron housing 66. The alternating current power source 72 supplies power from one of its terminals to the fixed phasing terminals 61 and 70 and from the other of its terminals to the selsyn motor 71. It will be ntoed that the cam rider contact 69 is connected to both the selsyn generator 34 and to the cam rider contact 67 within the magnetron. The return circuit between the selsyn generator 34 and the selsyn motor 71 is direct. The selsyn motor 71 is maintained in step with the selsyn generator 34.

The selsyn motor 71 in the magnetron housing 66 has a pinion 81 on its shaft that engages a peripherally toothed gear 80 secured to and rotating the phasing cam 68 and a magnetron tuning cam 82. The phasing cam 68, as previously stated, interrupts the connection between the phasing contacts 67 and 70. The magnetron tuning cam 82 tunes the magnetron through one cycle with each revolution of the toothed gear 80.

It will be noted that the selsyn units 34 and 71 are connected to the respective tuning devices through reduction gearing. While the selsyn units will synchronize themselves, the respective tuning devices can be positioned, relative to each other, in any one of several relationships, since one revolution of the selsyn unit occupies only a part of a revolution of the corresponding tuning unit. The contacts 60, 61, 67, and 70 serve to prevent the selsyn units from synchronizing themselves at relative positions of the tuning units other than the synchronous or "in-step" positions thereof.

The magnetron tuning cam 82 imparts a linear motion to a rod cam rider 83. The rod cam rider 83 is guided for reciprocating motion by a bushing 87 part of an arm 88 secured to the magnetron housing 66 by screws 89. The rotation of the magnetron tuning cam 82 imparts a desired sequence of displacement to the rod cam rider 83 against the yielding resistance of a coiled compression spring 91 housed within a spring socket 92 part of the magnetron housing 66. Access into the interior of the spring socket 92 is provided by a cap 94 that screws thereon, and is soldered in place to preserve the magnetron cavity vacuum, or by other desired arrangement.

Contamination of the interior of the magnetron anode housing 73, resulting from the migration of volatile gases, dust and the like, resulting from the operation of the mechanisms within the magnetron tuner housing 66, is preferably avoided by suitable means, such as by a flexible metal diaphragm 93 that separates these two compartments. The diaphragm 93 is secured along its peripheral edge to the magnetron housing 66 and at its center to the rod cam rider 83 by welding, solder or the like. Simultaneous initial evacuation of compartments on both sides of diaphragm 93 permits use of a thin, flexible diaphragm and facilitates rapid frequency variation thereby.

The cam rider 83 also is secured to a lever 95 that is pivoted at one end in a bracket 96 secured to the magnetron housing 66. The rod cam rider 83 is secured to the lever 95 at a distance from the bracket 96 in which the end of the lever 95 is journalled to provide a suitable moment arm therebetween to displace a desired plurality of tuning slugs 98, 99, etc., removably insertable within a corresponding number of anode cavities in the magnetron anode 97 within the anode housing 73. A magnetron cathode 100 is positioned centrally of and is insulated from the magnetron anode 97 in the anode housing 73. The cathode 100 preferably extends axially of the cavities in the anode 97 with respect to which it is negatively charged. The magnetron anode 97 and cathode 100 are positioned within the magnetic field maintained between the poles of the permanent magnet 74.

Signal output, of frequencies depending upon the degree of penetration of the tuning slugs 98, 99, etc., into the cavities of the magnetron anode 97, is derived from the magnetron anode 97 by a loop 101. The loop 101 has its curved end secured by welding or the like, to the inner surface of one of the anode cavities and its opposite end extending into a wave guide, not shown, or the like. The signal loop 101 is mounted in insulating material 102 from which it derives its support and which provides a hermetic seal with the anode housing 73. The interior of the magnetron anode housing 73 preferably is maintained in an evacuated condition. The signal frequency change cycle range and pattern is influenced by the contour of the magnetron tuning cam 82 as engaged by the rod cam rider 83, as for example, the contour shown in enlarged elevation in FIG. 2 of the drawings. The magnetron tuning cam 82 may have any desired contour capable of smooth operation.

In the operation of the form of the device that is shown in FIG. 1 of the drawings in obtaining rotary synchronization of the cams 55 and 68 it may be assumed initially that the cams 55 and 68 are out of synchronization at the time the switch 21 is closed. Upon the closing of switch 21, motor 26 starts up and, through the gear train shown, turns the shaft 40.

The pair of contacts 60, 61 are closed only when the cam rider contact 60 is on the cam riser 56, whereas the pair of phasing contacts 67, 70 are closed at all times excepting when the cam rider contact 67 is on the cam riser 69. Assuming one or the other of the two pairs of contacts 60, 61 and 67, 70 to be closed when the shaft 40 begins to turn upon the energization of the motor 26, then selsyn motor 71 within the magnetron housing 66 will be energized from the alternating current source 72 and will cause the magnetron phasing cam 68 to rotate until the pair of contacts 67, 70 interrupts the power to the selsyn motor 71 causing it to stop, since when the system is not in synchronism, the contacts 60, 61 will be open.

The interruption in power to the selsyn motor 71 is without effect upon the motor 26 powered from the battery 27 through the closed switch 21. The motor 26 under these circumstances continues to rotate the shaft 40 and hence the frequency indicating cam disc 55 until the cam rider contact 60 rides up on the cam riser 56 and engages the fixed contact 61. Closing the circuit at the contacts 60, 61 again energizes the selsyn motor 71, causing it to rotate the cam 68, thereby moving the cam riser contact 69 from beneath the cam rider contact 67 and permitting the cam rider contact 67 to contact again the fixed contact 70 and return the system to synchronization, and thereby continue the energization of the selsyn motor 71.

The gear ratio between the shafts 33 and 40 is the same as that within the magnetron or the ratio between the gears 35 and 36 is the same as that between the pinion 81 and gear 80. When the rotation of the selsyn motor 71 is initiated with both cam risers 56 and 69 under their respective contacts 60 and 67, the rotation of the cams 55 and 68 is synchronized.

The rotation of the shaft of the selsyn motor 71 continues uninterruptedly when synchronized because the two pairs of contacts 60, 61 and 67, 70 are connected in parallel and also because the cam riser 56 is slightly wider than the cam riser 69. With these provisions one pair of contacts is always closed as long as the system is in synchronism. By the provision of suitable switching interlocks this synchronized relation is maintained. For example, as long as the manually operated switch 21 is interlocked with a switch of the alternating current source 72, it is impossible to rotate the shaft 33 unless selsyn locking exists between shaft 33 and the shaft of the selsyn motor 71.

By providing a second interlock between the selsyn generator 23 and the selsyn motor 52 and the alternating current source 72, it will be impossible to rotate the shaft 40 by turning the frequency setting knob 22 unless the selsyn motor 71 in the magnetron is in operation. In the above described manner synchronization is maintained in the system substantially at all times with a minimum of necessity for resynchronization.

In the system illustrated in FIG. 3 of the drawings a modified method of operation is employed. In the assemblage shown in FIG. 3 the coupling and the decoupling of the mechanical rotation in a modified tunable magnetron occurs through an electromagnet 105 instead of through a selsyn motor, as in FIG. 1. The synchronizing operation in the apparatus shown in FIG. 3 is substantially analogous to that shown in FIG. 1.

In the assemblage shown in FIG. 3 the equipment at the operator's position 20' is the same as that shown in FIG. 1 and hence bears the same designations. Components within the operator's position 20' connected with components within the radio frequency unit 30' through the receiver tracking oscillator 46 are the same in FIGS. 1 and 3 and hence the designation of components for this part of the circuit are the same. In FIG. 3, the shaft 33' conforms with the shaft 33 in FIG. 1 with the electromagnet 105 replacing the selsyn generator 34 on the end of the shaft 33' to provide an electrical clutch for inducing mechanical operations within the magnetron. The electromagnet 105 is turned by the shaft 33' upon the closing of the switch 21 at the operator's position 20' and serves to tune continuously the magnetron as shown in FIG. 3.

The electromagnet 105 is maintained at a predetermined strength by means of a winding 106 that is energized from a battery 107. The battery 107 may be applied in the circuit of the winding 106 as preferred. In the application shown in FIG. 3 the battery 107 has its positive terminal applied to the lead connecting the fixed phasing contacts 61 and 123. The cam riding phasing contacts 60 and 122 are connected by a lead that is connected through electrical brush 108 to grounded shaft 33'. The negative terminal of the battery 107 is applied through electrical brush 109 to a collar 110 insulated from the grounded shaft 33'. The collar 110 is connected through the winding 106 to the core of the electromagnet 105 that is grounded to the shaft 33'.

The type of magnetron shown in FIG. 3 comprises externally a hollow nonmetallic cap 115 sealed to a hollow magnetron housing 116 to permit an evacuated condition therewithin. The poles of a permanent magnet 142 are positioned upon opposite sides of an anode part of the magnetron housing 116.

The tuning of the magnetron shown in FIG. 3 is accomplished by closing the switch 21 at the operator's position 20' causing the energization of the motor 26 and the consequent displacement or rotation of the electromagnet 105. A permanent magnet rotor 112 is disposed inwardly of the nonmetallic cap 115 and, with the electromagnet 105, comprises an electrical clutch. The magnet rotor 112 is on one end of a rotatable shaft 146 and a gear 117 is on the opposite end thereof within the magnetron housing 116. The magnet rotor 112 is permanently polarized as indicated in FIG. 3 and is rotatably mounted between the poles of or within the magnetic field of the rotatable electromagnet 105. As the electromagnet 105 is displaced or rotated the magnet rotor 112 is displaced or is rotated in a corresponding amount and direction.

The displacement or rotation of the magnet rotor 112 carries with it the gear 117. The gear 117 engages a gear 118 to turn a shaft 145 that is journalled for rotation within the magnetron. The shaft 145 also carries a phasing cam 120 and a magnetron tuning cam 121. The phasing cam 120 has a riser upon its periphery which is engaged by the cam rider contact 122 to make and break the contacts 122, 123 with each rotation of the cam 120. The contacts 122 and 123 are mounted in and supported by a glass bead 125 disposed in an aperture in the magnetron housing 116.

The magnetron tuning cam 121 has a desired peripheral configuration for imparting a sequential tuning cycle to the magnetron with each revolution of the cam 121. The magnetron tuning cam 121 bears against a cam rider 135 portion of a tuning lever 136 under the yielding influence of a tension spring 134. The magnetron tuning lever 136 is pivoted at one end in a bracket 137 secured to the magnetron housing 116 and at its opposite end carries a plurality of tuning slugs 138, 139, etc. conforming in number with the number of resonant cavities in the magnetron anode 140. As the shaft 145 is displaced or rotated the magnetron tuning cam 121 is displaced or rotated in the same sense and degree against the cam rider 135 causing the magnetron tuning lever 136 to be tilted about its end that is journalled in the bracket 137. The tilting of the magnetron tuning lever 136 moves the tuning slugs 138, 139, etc. in or out of the resonant cavities in the magnetron anode 140.

Signal output from the magnetron is derived through a loop 130. The loop 130 has its loop end welded to the inner face of one of the resonant cavities in the magnetron anode 140 and its straight end extending into a wave guide, not shown, for conducting signal away from the magnetron. The loop 130 is mounted in and supported by an insulating glass rod 131 that is sealed in the wall of the magnetron anode 140 and that extends through the magnetron housing 116. A magnetron cathode 141, that is negative with respect to the magnetron anode 140, extends axially and centrally of the magnetron anode 140 between the poles of the permanent magnet 142.

In the operation of the components and the tunable magnetron shown in FIG. 3, the sequential operations and results are related closely to those described for the assemblage shown in FIG. 1 with an electrical clutch replacing the selsyn generator 34 and selsyn motor 71 in FIG. 1. In the operation of the electrical clutch the energization of the winding 106 of the electromagnet 105 is continuous as long as the shafts 40 and 145 are in the same relative positions or are in step with each other, as far as receiver-transmitter tracking is concerned.

The direct current motor 26 turns shaft 33', the electrical clutch and frequency indicating cam 55 continuously when the switch 21 is closed. The frequency indicating cam 55 is in one-to-one relation with the magnetron phasing cam 120. The rotary relation between the shafts 33' and 40 is the same ratio as that between the magnetron shafts 146 and 145, respectively. This cam phasing conforms with selsyn installations in search radar work. The electromagnetic tuning drive in the present disclosure is an improvement over anything comparable that has been known or used heretofore. The continuous turning of the shaft 33' turns consecutively the electromagnet 105, the permanent rotor 112, the phasing cam 120 and finally the magnetron tuning cam 121.

The mechanism is brought into synchronization in a manner analogous to that described for the mechanism shown in FIG. 1. During periods of synchronization the frequency indicating cam 55, and the magnetron phasing cam 120 operates to energize continuously the winding 106 of the electromagnet 105 and to induce thereby the continuous rotation of the permanent magnet rotor 112 in the magnetron. The resultant continuous rotation of the magnetron tuning cam 121 imparts a displacement of the tuning slugs 138, 139, etc. with respect to the resonant cavities in the anode 140 that is determined by the peripheral contour of the cam 121. Changes in the degree of penetration of the tuning slugs 138, 139, etc. into the resonant cavities of the magnetron anode 140 modify correspondingly the frequency of the signal impressed on the loop 130.

It will be apparent therefore that under the control of an operator at the operator's position 20', the equipment shown in FIG. 3 as a part of a radar transmitter-receiver set, can be made to operate with the switch 21 open to radiate and receive radar signals at a predetermined fixed frequency indicated on the dial 24. The fixed signal frequency is subject to change by operation of the manual knob 22, as one form of operation of the device.

The equipment shown in FIG. 3 is adapted equally with that shown in FIG. 1 for the transmission and reception of radar signal of continuously changing and, if desired, of erratically changing frequency influenced very largely by the contour adopted for the cam 121 for tuning the magnetron at which the signal originates.

A modified assembly for accomplishing comparable results is shown in FIG. 4 of the accompanying drawings. In the assemblage there shown, control over the apparatus is exercised from an operator's position 20". For purposes of association some parts of the form of the device that are shown in FIG. 4 bear numerals conforming with numerals designating corresponding parts in FIGS. 1 and 3 but primed in FIG. 4. As in the two previously described sets of equipment, at the operator's position with the continuous sweep switch 21' open, control over the frequency of radar signal produced is exercised for a fixed frequency by operation of a knob 22'. Operation of the fixed frequency adjusting knob 22' turns the rotor in a selsyn generator 23' together with a frequency indicating disc 24' passing a fixed frequency indicator 25'.

The selsyn generator 23' at the operator's position 20" is connected with a selsyn motor 52' in the illustrated fragmentary part of a radio frequency unit 30". The manually operated continuous sweep switch 21' at the operator's position 20" is connected in series with a battery 27' and a manually operable rheostat 150 connected with a frequency motor 26' in the radio frequency unit 30". The rheostat 150 serves as a scanning speed control and may be adjusted manually to a resistance value shown by a resistance setting and indicating arm 151 movable over a resistance indicating scale part of the rheostat 150. Manual adjustment of the rheostat resistance indicating arm 151 determines the speed of operation of the motor 26' or of its shaft 40' in the radio frequency unit 30". The motor shaft 40' is also turned through a pair of bevel gears 50' and 51' by the selsyn motor 52' that is maintained in step with the selsyn generator 23' at the operator's position 20". The rotation of the motor shaft 40' turns a frequency indicating indicator arm 153 along a frequency scale upon a frequency indicating dial or disc 154. The motor shaft 40' also has mounted thereon a selsyn generator rotor or armature 155 bearing a winding 156 having its ends connected to a pair of rings 157 and 158.

The selsyn generator armature 155 and its winding 156 rotate with a selsyn generator polyphase stator 165. The shaft 40' mechanically operates a tracking condenser 42' that applies its output to a tracking oscillator 46' that are comparable in component assembly and in function with the condenser 42 and oscillator 46, respectively, shown in FIGS. 1 and 3 of the accompanying drawings. A single phase alternating current power supply or source 161 applies its potential through the brushes 159 and 160 across the winding 156 upon the selsyn generator armature 155.

A magnetron tuning drive 164 part of the radio frequency unit 30" is shown diagrammatically in FIG. 4 and in fragmentary plan and sectional elevational views FIGS. 5 and 6, respectively. The magnetron tuning drive 164 tunes a magnetron with which the assemblage shown in FIGS. 4, 5 and 6 may be associated. Within the magnetron tuning drive 164 a winding 162 upon a substantially U-shaped electromagnetic core 163 has electrical power applied across it in parallel with the brushes 159 and 160 from the power source 161. Also disposed within the magnetron tuning drive 164 are a selsyn motor comprising a polyphase stator 166 within which a selsyn motor core 167 is positioned for rotation upon a magnetron tuning shaft 33". A plurality of laminated plates 166' are part of the polyphase stator 166. The selsyn motor polyphase stator 166 and selsyn generator polyphase stator 165 are connected at 120° intervals in the usual manner. The selsyn motor core 167 is polarized oppositely at its pole pieces 168 and 169 positioned at opposite ends of a common diameter on webs 195 and 196 respectively. The shaft 33' is analogous to the shafts 33 and 33' in FIGS. 1 and 3, respectively, of the drawings in that it actuates as displacement or as rotation the cam 68 in FIG. 1 and the cam 121 in FIG. 3 to time the magnetron anodes 97 and 140 respectively, as previously described.

The mechanical appearance of such a magnetron tuning drive 164 is shown in fragmentary form in FIGS. 5 and 6 of the drawings. In these two figures the magnetron tuning drive 164 illustratively comprises an evacuated tubular metal magnetron housing 180 terminating in a selsyn motor core housing cylindrical hollow cap 181 of a nonmagnetic material such as a plastic, glass or the like, that continues the evacuated condition of the magnetron housing 180. The metal magnetron housing 180 provides an electrical shield for its contents which function is continued in a metallic disc 182 extending outwardly from the cylindrical magnetron housing 180 and threaded at its radially outer edge for receiving a hollow metallic magnetically shielding cap 183. A pair of leads 184 connect the alternating current source 161 with the pair of electromagnetic windings 162 in series to maintain the pair of electromagnet cores 163 in a polarized condition. As shown and described previously, the selsyn motor polyphase stator winding 166 is continued in series on both axial sides of the laminated plates 166' and is coplanar with the pair of electromagnetic windings 162 and concentrically outwardly of the electrically nonconductive selsyn motor core housing cap 181.

The selsyn motor core within the cap 181 comprises a pair of circular discs 167 and 167' that are separately coplanar with the upper and lower plates of the electromagnetic core 163 and are mounted upon the magnetron tuning shaft 33" that extends axially of the magnetron tuning drive housing 180. As previously described the circular disc 167 has the pole piece 168 attached to it by the web 195 and the circular disc 167' has the pole piece 169 attached to it by the web 196. The pole pieces 168 and 169 are coplanar with respect to each other and with the selsyn motor polyphase stator laminated plates 166' radially inwardly of which they are mounted for rotation.

The selsyn motor core within the cap 181 on the end of the magnetron tuning shaft 33" is supported for rotation within the nonmagnetic cap 181 by suitable means such as by a pair of collars 185 and 186 as part of the shaft 33" disposed on axially opposite sides of a bushing 187 of which a removable cap 188 secured by screws 189 is a part. An arm or bracket 190 supports the bushing 187 from the magnetron housing 180.

The form of the present invention that is shown in FIGS. 4, 5, and 6 of the accompanying drawings is controlled from the operator's position 20" in a similar manner and with similar results as compared with the control and operation of the forms of the invention illustrated in FIGS. 1 and 3 of the drawings.

With the continuous sweep switch 21' open, the sweep drive motor 26' is inactivated and signals from the radar set of which the disclosed apparatus is a part will be at a fixed frequency indicated by the fixed indicator 25' on the rotatable dial 24' and by the indicator arm 153 on the fixed frequency indicating fixed dial 154.

An adjustment by operation of the manual knob 22' to another fixed frequency as indicated by the fixed indicator 25' upon the rotatable dial 24' will cause the selsyn motor 52' to keep in step with the selsyn generator 23' by displacing or rotating, through the pair of gears 50' and 51', the shaft 40' and hence the indicator arm 153 with respect to the fixed frequency indicating dial 154 to read the new frequency indicated by the fixed indicator 25' upon the rotatable dial 24'.

The displacement or rotation of the shaft 40' also displaces or rotates in the same sense and to the same degree, the selsyn generator armature 155 and its winding 156, as well as the movable plate of the variable condenser 42' as in the comparable operation of the previously described systems. The selsyn motor in the magnetron tuning drive 164 keeps in step with the selsyn generator with which it is connected electrically and hence the selsyn motor core 167 is displaced in sense and degree, as also is the magnetron tuning shaft 33", in the same amount as is the selsyn generator armature or core 155 and its winding 156 with respect to the selsyn generator polyphase stator winding 165. In the described manner the resultant displacement or rotation of the magnetron tuning shaft 33" causes a corresponding change in the degree of penetration of the tuning slugs 98, 99, etc. into the magnetron anode 97 or of the tuning lugs 138, 139, etc. into the magnetron anode 140, comparable to a corresponding movement of shaft 33 or of the shaft 33' respectively and hence a resultant change in the frequency of the radar signal produced by the magnetron tuned by the equipment shown in FIGS. 4, 5 and 6 of the drawings.

The closing of the continuous sweep switch 21' energizes the frequency scanning motor 26' that turns continuously the shaft 40' at a rate of turn dependent upon the manual setting of the indicator arm 151 with respect to the scanning speed control rheostat 150. The operation of the frequency scanning motor 26' controls the frequency acceptance of the receiver of the system that is coupled to the tracking oscillator 46' through the tracking condenser 42'.

The rotation of the shaft 40' rotates the selsyn generator armature comprising the core 155 bearing the winding 156 continuously energized with alternating current from the A.C. source 161 to impart electromagnetic properties to the electromagnet core 163. The electromagnetic properties so imparted to the electromagnet core 163 are indicated in FIG. 6 of the drawings as continuing through the selsyn motor polyphase stator 166 to influence the rotary disposition of the selsyn motor core 167 and the consequent rotation of the shaft 33" by means of which the tuning of an associated magnetron anode is accomplished. The magnetron anodes that are contemplated hereby preferably contain eight resonant cavities with a corresponding number of tuning slugs 98, 99, etc, or 138, 139, etc. adapted for making controlled degrees of penetration thereinto during variable tuning operation.

Manual controls are provided since they are suitable for avoiding many forms of interference. With the motor operated continuously variable frequency is available for types of interference that are not overcome by signals of constant frequency.

It is to be understood that the particular assemblages of magnetron tuning drives that are shown and described herein for use with radar sets have been submitted for the purposes of illustrating and explaining operative embodiments of the present invention and that additional modifications may be made therein without departing from the scope of the present invention.

What I claim is:

1. In a variable frequency radar system, a magnetron having a first rotatable frequency-varying means, a receiver tracking oscillator having a second rotatable frequency varying means, step-up gear units connected to said first and second rotatable frequency varying means, respectively, means for synchronously operating said first and second rotatable frequency-varying means comprising two selsyn devices each mechanically connected to respective ones of said step-up gear units and electrically connected to each other, whereby said selsyn devices rotate more than one revolution for each revolution of said rotatable frequency-varying means and may not synchronize themselves at positions other than the synchronous position of said rotatable frequency-varying means, a normally-closed switch actuated by one of said rotatable frequency-varying means and connected to de-energize said selsyn devices at a predetermined angular position of said one of said rotatable frequency-varying means, a normally-open switch actuated by the other of said rotatable frequency-varying means and connected to energize said selsyn devices at an angular position corresponding to said predetermined angular position of one of said rotatable frequency-varying means, and means for driving the step-up gear unit associated with said normally-open switch, whereby said selsyn units are de-energized at said predetermined angular position of the rotatable frequency-varying means associated with said normally-closed switch when the angular position of the rotatable frequency-varying means associated with the normally-open switch is in an angular position other than the angular position corresponding to said predetermined angular position.

2. In a variable frequency radar system, a magnetron having an evacuated housing, a flexible metal diaphragm within the magnetron housing and sealed along the diaphragm edge to the inner surface of the housing and dividing the magnetron housing into an evacuated first chamber and an evacuated second chamber with the first chamber providing the resonant cavity of the magnetron, a mechanically shiftable magnetron output frequency varying means within the magnetron resonant cavity first chamber, means connecting said mechanically shiftable frequency varying means to said diaphragm for actuation thereby, cam means within said second chamber for actuating said diaphragm, first step-up gear means actuating said cam means, a receiver tracking oscillator having a mechanically shiftable frequency-varying means, a second step-up gear unit actuating said mechanically shiftable frequency-varying means of said receiver tracking oscillator, means for simultaneously actuating said first and second gear units for maintaining the operating frequencies of the magnetron and the receiver tracking oscillator separated from each other by a constant frequency difference comprising two selsyn devices mechanically connected to respective ones of said step-up gear units and electrically connected to each other, whereby said selsyn devices rotate more than one revolution for each operating cycle of said mechanically actuated frequency-varying means and may not synchronize at positions other than the synchronous positions of said mechanically actuated frequency-varying means, a normally closed switch actuated by said cam means at a predetermined point in its operating cycle to de-energize said selsyn devices, a normally-open switch actuated by the mechanically actuated frequency-varying means of said receiver tracking oscillator to energize said selsyn devices at a position synchronized with said predetermined position of said cam means, and means for driving said mechanically shiftable frequency-varying means of said receiver tracking oscillator, whereby said selsyn units are de-energized at said predetermined position of said cam means when the mechanically shiftable frequency-varying means of said receiver tracking oscillator is in a position other than the position synchronous therewith and re-energized when the mechanically shiftable frequency varying means of said receiver tracking oscillator reaches said position.

References Cited in the file of this patent

UNITED STATES PATENTS

| | | |
|---|---|---|
| 1,922,759 | Davis | Aug. 15, 1933 |
| 1,926,393 | Manson et al. | Sept. 12, 1933 |
| 2,321,971 | Becker | June 15, 1943 |
| 2,376,667 | Cunningham et al. | May 22, 1945 |
| 2,412,991 | Labin | Dec. 24, 1946 |
| 2,444,750 | Ptacek | July 6, 1948 |
| 2,452,601 | Ranger | Nov. 2, 1948 |
| 2,454,797 | Hardy | Nov. 30, 1948 |
| 2,456,430 | Patterson | Dec. 14, 1948 |
| 2,474,663 | Goddard | June 28, 1949 |
| 2,490,808 | Hoffman | Dec. 13, 1949 |
| 2,506,766 | Bartelink | May 9, 1950 |
| 2,532,589 | Ieu-Liang Wu | Dec. 5, 1950 |
| 2,534,503 | Donal et al. | Dec. 19, 1950 |
| 2,543,042 | Miller | Feb. 27, 1951 |